US012339219B2

(12) United States Patent
Liu et al.

(10) Patent No.: US 12,339,219 B2
(45) Date of Patent: Jun. 24, 2025

(54) ADAPTIVE CHARACTERISTIC SPECTRAL LINE SCREENING METHOD AND SYSTEM BASED ON ATOMIC EMISSION SPECTRUM

(71) Applicant: NCS Testing Technology CO., LTD., Beijing (CN)

(72) Inventors: Jia Liu, Beijing (CN); Feipeng Cui, Beijing (CN); Xiaopeng Li, Beijing (CN); Ling Liu, Beijing (CN); Hongwei Shi, Beijing (CN); Feifei Guo, Beijing (CN); Ying Zhao, Beijing (CN); Xuejing Shen, Beijing (CN); Haizhou Wang, Beijing (CN)

(73) Assignee: NCS TESTING TECHNOLOGY CO., LTD., Beijing (CN)

( * ) Notice: Subject to any disclaimer, the term of this patent is extended or adjusted under 35 U.S.C. 154(b) by 360 days.

(21) Appl. No.: 17/962,602

(22) Filed: Oct. 10, 2022

(65) Prior Publication Data
US 2024/0068936 A1 Feb. 29, 2024

(51) Int. Cl.
*G01N 21/31* (2006.01)
*G06F 18/2132* (2023.01)
*G06N 3/126* (2023.01)

(52) U.S. Cl.
CPC ... *G01N 21/3103* (2013.01); *G06F 18/21322* (2023.01); *G06N 3/126* (2013.01); *G06F 18/21326* (2023.01); *G06F 2218/04* (2023.01)

(58) Field of Classification Search
CPC ... G01N 21/3103; G01N 21/718; G01N 21/62
See application file for complete search history.

(56) References Cited

U.S. PATENT DOCUMENTS 9,696,204 B2 * 7/2017 Liu ............... G01N 21/274

\* cited by examiner

*Primary Examiner* — Tony Ko
(74) *Attorney, Agent, or Firm* — Ming Jiang; OPENPTO US LLC

(57) ABSTRACT

An adaptive characteristic spectral line screening method and system based on atomic emission spectrum are provided, the method includes: using a set characteristic screening optimization method to perform a plurality of optimization rounds of characteristic screening, obtaining an initialized spectral dataset of each round of the characteristic screening and initialized characteristic population genes; obtaining an optimal characteristic population gene of each round by a set analysis method, a fitness function, and an iteration of a genetic algorithm; obtaining an optimized characteristic spectral information set when the plurality of optimization rounds reach set optimization rounds; performing combination statistics and discriminant analyses on the optimized characteristic spectral information set to complete an adaptive characteristic spectral line screening. The disclosure can efficiently and automatically screen out the characteristic spectral lines that meet the analysis requirements in the complex atomic emission spectrum, thus ensuring the effectiveness and accuracy of screening the characteristic spectral lines.

6 Claims, 2 Drawing Sheets

ADAPTIVE CHARACTERISTIC SPECTRAL LINE SCREENING METHOD AND SYSTEM BASED ON ATOMIC EMISSION SPECTRUM

TECHNICAL FIELD

The present disclosure relates to a technical field of atomic emission spectral analysis, in particular to an adaptive characteristic spectral line screening method and system based on atomic emission spectrum.

BACKGROUND

Atomic emission spectrometry has the advantages of rapidity, sensitivity and selectivity. It plays an important role in qualitative, semi quantitative and quantitative analysis of various inorganic materials. With the emergence of various new light sources and new technologies, the atomic emission spectrometry has become one of the most prestigious modern analytical technologies.

The atomic emission spectrometry realizes the qualitative or quantitative analysis of materials according to the wavelength and spectral intensity of the characteristic spectrum radiated by the excited atoms of the elements in the materials to be tested. Therefore, the effective identification and selection of the characteristic spectral lines have also become one of the important factors affecting the analytical ability of emission spectrum. With the diversified application of analysis and testing technology, instruments such as portable devices, desktop devices, online devices and others with different hardware configurations also appear to meet the needs, the resolutions and detection abilities of the spectroscopic systems matched with the instruments are also different. There are a lot of atomic emission spectrum lines, which are mainly verified and discriminated by experience through the standard spectrum line database combined with the actual analysis results. It needs to invest a lot of manpower and time to calibrate and verify the spectral lines, which has long time consuming and low efficiency. At the same time, there are more and more studies on spectral line selection by algorithms, but due to the richness and complexity of atomic spectral lines, it is still restricted by the efficiency, effectiveness and automation of algorithms in the practical application process. Therefore, for different analysis needs, realizing an efficient and accurate selection of characteristic spectral lines is the primary task to achieve analyses, and is also a crucial part of the whole analysis task.

SUMMARY

The purpose of the present disclosure is to provide an adaptive characteristic spectral line screening method and system based on atomic emission spectrum, which can efficiently and automatically screen characteristic lines that meet analysis needs in complex atomic emission spectrum, ensure the effectiveness and accuracy of screening the characteristic spectral lines, and provide a reliable guarantee for the accurate and stable development of analysis tasks.

In order to achieve the above purpose, the present disclosure provides following schemes.

An adaptive characteristic spectral line screening method based on atomic emission spectrum, including following steps:
   determining a spectral dataset based on original spectral signals of a sample to be analyzed;
   using an set characteristic screening optimization method to perform a plurality of optimization rounds of characteristic screening on the spectral dataset, obtaining an initialized spectral dataset of each round of the characteristic screening and initialized characteristic population genes corresponding to the initialized spectral dataset;
   obtaining an optimal characteristic population gene of each round by a set analysis method, a fitness function, and an iteration of a genetic algorithm based on the initialized spectral dataset and the initialized characteristic
   obtaining an optimized characteristic spectral information set corresponding to an optimal characteristic population gene set composed of optimal characteristic population genes of each round in the set optimization rounds when the plurality of optimization rounds reach set optimization rounds; and
   performing combination statistics and discriminant analyses on the optimized characteristic spectral information set to complete an adaptive characteristic spectral line screening.

In an embodiment, the determining a spectral dataset based on original spectral signals of a sample to be analyzed, including:
   selecting a sample meeting a coverage of elements and contents as the sample to be analyzed according to analysis requirements;
   performing a spectral analysis on the sample to be analyzed to obtain the original spectral signals of the sample to be analyzed;
   performing a spectral preprocessing on the original spectral signals to obtain spectral information; and
   selecting all or some of the spectral information processed by the spectral preprocessing to build the spectral dataset.

In an embodiment, the spectral preprocessing includes background correction and filtering noise reduction.

In an embodiment, the using a set characteristic screening optimization method to perform a plurality of optimization rounds of characteristic screening on the spectral dataset, obtaining an initialized spectral dataset of each round of the characteristic screening and initialized characteristic population genes corresponding to the initialized spectral dataset, including:
   performing the plurality of optimization rounds of characteristic screening on the spectral dataset, selecting some or all of the spectral information from the spectral dataset, and obtaining the initialized spectral dataset; and
   encoding the spectral information in the initialized spectral dataset based on spectral characteristics to obtain uninitialized characteristic population genes, and determining the initialized characteristic population genes based on the uninitialized characteristic population genes.

In an embodiment, the obtaining an optimal characteristic population gene of each round by a set analysis method, a fitness function, and an iteration of a genetic algorithm based on the initialized spectral dataset and the initialized characteristic population genes, including:
   selecting a corresponding analysis method as the set analysis method according to analysis requirements, the set analysis method determines a model parameter and an evaluation indicator of an analysis method based on the initialized spectral dataset and the initialized characteristic population genes;

the fitness function obtaining a population fitness based on the initialized characteristic population genes and the model parameter and the evaluation indicator of the analysis method; and the genetic algorithm iterating based on the population fitness and the initialized characteristic population genes to obtain a new characteristic population gene until an iterative algebra of the genetic algorithm reaches a set maximum value or the population fitness reaches a set fitness threshold value, and taking a last obtained new characteristic population gene as the optimal characteristic population gene.

In an embodiment, the original spectral signals are atomic emission spectral signals which include wide band continuous spectrum signals acquired by an array detector or narrow band spectrum signals acquired by a photodetector.

In an embodiment, the set analysis method includes one of a quantitative analysis method, a semi quantitative analysis method, a discriminant analysis method, and an analysis method that can be characterized by modeling.

In an embodiment, the set analysis method includes one of a quantitative analysis method, a semi quantitative analysis method, a discriminant analysis method, and an analysis method that can be characterized by modeling.

In an embodiment, the performing combination statistics and discriminant analyses on the optimized characteristic spectral information set to complete an adaptive characteristic spectral line screening, including:

performing one or more of a probability analysis, a frequency analysis, and any combination result analyses on the optimized characteristic spectral information set to obtain statistical information of each characteristic spectral line; and by the discriminant analyses, if an evaluation value corresponding to the statistical information of the each characteristic line being greater than a set screening threshold value, completing the adaptive characteristic spectral line screening of the optimized characteristic spectral information set.

The present disclosure also provides an adaptive characteristic spectral line screening system based on atomic emission spectrum, which is applied to any of the above adaptive characteristic spectral line screening methods based on atomic emission spectrum, includes:

a first determination unit, configured to determine a spectral dataset based on original spectral signals of a sample to be analyzed;

a first obtaining unit, configured to performing a plurality of optimization rounds of characteristic screening on the spectral dataset by using a set characteristic screening optimization method, and obtaining an initialized spectral dataset of each round of the characteristic screening and initialized characteristic population genes corresponding to the initialized spectral dataset;

a second obtaining unit, configured to obtain an optimal characteristic population gene of each round by a set analysis method, a fitness function, and an iteration of a genetic algorithm based on the initialized spectral dataset and the initialized characteristic population genes;

a third obtaining unit, configured to obtain an optimized characteristic spectral information set corresponding to an optimal characteristic population gene set composed of optimal characteristic population genes of each round in the set optimization rounds when performing the plurality of optimization rounds up to set optimization rounds; and a first data processing unit, configured to perform combination statistics and discriminant analyses on the optimized characteristic spectral information set to complete an adaptive characteristic spectral line screening.

The present disclosure also provides an electronic device (also referred to an adaptive characteristic spectral line screening system based on atomic emission spectrum), including a memory, a processor, and a computer program stored in the memory and executable on the processor, when the processor executes the computer program, realizing the steps of any of the above adaptive characteristic spectral line screening methods based on atomic emission spectrum.

According to the adaptive characteristic spectral line screening method based on atomic emission spectrum provided by the present disclosure, the present disclosure discloses following technical effects. Using a set characteristic screening optimization method to initialize a spectral dataset in view of different analysis requirements of a sample to be analyzed, and obtaining corresponding initialized characteristic population genes; based on the initialized characteristic population genes, obtaining an optimized characteristic spectral information set by a set analysis method, a fitness function, and an iteration of a genetic algorithm; the present disclosure can efficiently and automatically screen characteristic spectral lines that meet the analysis requirements in a complex atomic emission spectrum, ensure the effectiveness and accuracy of screening the characteristic spectral lines, and provide a reliable guarantee for the accurate and stable implementation of analysis tasks. The method is applicable to atomic emission spectrum with each of light sources such as spark light source, arc light source, plasma light source, and laser light source; and the method is used to realize adaptive screening of characteristic spectral lines of analytical elements in atomic emission spectrometry analysis technology.

BRIEF DESCRIPTION OF DRAWINGS

In order to more clearly explain the embodiments of the present disclosure or the technical schemes in the prior art, the following will briefly introduce drawings that need to be used in the embodiments. It is obvious that the drawings in the following description are only some embodiments of the present disclosure. For those skilled in the art, other drawings can be obtained from these drawings without giving creative work.

DETAILED DESCRIPTION OF EMBODIMENTS

The technical solutions in the embodiments of the present disclosure will be described clearly and completely below in combination with the drawings in the embodiments of the present disclosure. Obviously, the described embodiments are only some of the embodiments of the present disclosure, not all of them. Based on the embodiments of the present disclosure, all other embodiments obtained by those skilled in the art without creative work should belong to the protection scope of the present disclosure.

A purpose of the present disclosure is to provide an adaptive characteristic spectral line screening method and system based on atomic emission spectrum, the present disclosure can efficiently and automatically screen characteristic spectral lines that meet the analysis requirements in a complex atomic emission spectrum, ensure the effectiveness and accuracy of screening the characteristic spectral lines, and provide a reliable guarantee for the accurate and stable implementation of analysis tasks.

In order to make the above purpose, characteristics, and advantages of the present disclosure more obvious and understandable, the present disclosure will be further described in detail in combination with the drawings and specific embodiments.

Figure 1:
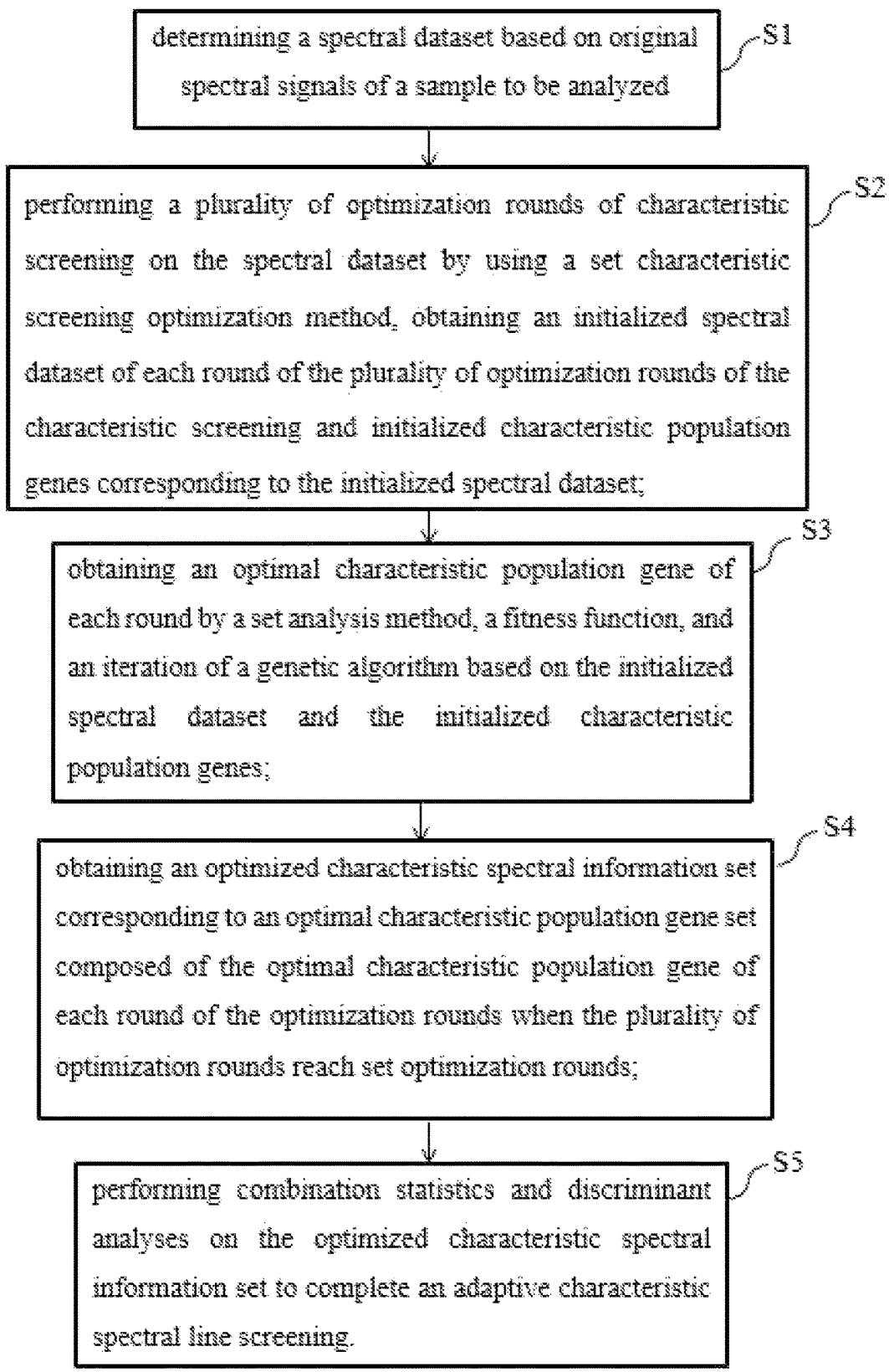
FIG. 1 shows a schematic flowchart of an adaptive characteristic spectral line screening method based on atomic emission spectrum of the present disclosure.

As shown in FIG. 1, an adaptive characteristic spectral line screening method based on atomic emission spectrum, including following steps:

S1, determining a spectral dataset based on original spectral signals of a sample to be analyzed;

among them, the sample to be analyzed may be a standard substance to be analyzed or an experimental sample; the original spectral signals may be atomic emission spectral signals which include wide band continuous spectrum signals acquired by an array detector or narrow band spectrum signals acquired by a photodetector, the photodetector may be a photomultiplier tube and so on;

S2, using a set characteristic screening optimization method to perform a plurality of optimization rounds of characteristic screening on the spectral dataset, obtaining an initialized spectral dataset of each round of the characteristic screening and initialized characteristic population genes corresponding to the initialized spectral dataset; among them, the set characteristic screening optimization method may be expressed as: optMtd (gav, dataset, t), where, the gav represents basic parameters and characteristic screening results of a current genetic algorithm, the dataset represents the spectral dataset, and the t represents the optimization rounds;

S3, obtaining an optimal characteristic population gene of each round by a set analysis method, a fitness function, and an iteration of a genetic algorithm based on the initialized spectral dataset and the initialized characteristic S4, when the plurality of optimization rounds reach set optimization rounds, obtaining an optimized characteristic spectral information set corresponding to an optimal characteristic population gene set composed of an optimal characteristic population gene of each round in the set optimization rounds; among them, decoding each the optimal characteristic population gene in the optimal characteristic population gene set to obtain corresponding optimized spectral characteristic information, thus forming the optimal spectral characteristic information set;

S5, performing combination statistics and discriminant analyses on the optimized characteristic spectral information set to complete an adaptive characteristic spectral line screening.

In an embodiment, the determining a spectral dataset based on original spectral signals of a sample to be analyzed, including:

selecting a sample meeting a coverage of elements and contents as the sample to be analyzed according to analysis requirements;

performing a spectral analysis on the sample to be analyzed to obtain the original spectral signals of the sample to be analyzed; specifically, using a spectral analyzer to perform the spectral analysis on the sample to be analyzed;

performing a spectral preprocessing on the original spectral signals to obtain spectral information; among them, the spectral preprocessing including background correction, filtering noise reduction and so on;

selecting all or some of the spectral information processed by the spectral preprocessing to build the spectral dataset.

In an embodiment, the using a set characteristic screening optimization to perform a plurality of optimization rounds of characteristic screening on the spectral dataset, obtaining an initialized spectral dataset of each round of the characteristic screening and initialized characteristic population genes corresponding to the initialized spectral dataset, including:

performing the plurality of optimization rounds of characteristic screening on the spectral dataset, selecting some or all of the spectral information from the spectral dataset in the each round of the characteristic screening to obtain the initialized spectral dataset; among them, selection methods include random selection, specific selection and so on, selecting different spectral information in the spectral dataset in the each round of the characteristic screening, which can improve the effectiveness of the characteristic screening; and encoding the spectral information in the initialized spectral dataset based on spectral characteristics to obtain uninitialized characteristic population genes, and determining the initialized characteristic population genes based on the uninitialized characteristic population genes.

Among them, gene is a concept of the genetic algorithm, and the encoding is to encode spectral information into genes that can be used and optimized by the genetic algorithm to complete the mapping from phenotype to genotype.

Specifically, the determining the initialized characteristic population genes based on the uninitialized characteristic population genes includes:

in the first round of optimization screening, using an initialization algorithm to initialize uninitialized characteristic population genes to obtain the initialized characteristic population gene; and in the second or later rounds of optimization screening, initializing uninitialized characteristic population genes by referring to optimal characteristic population gene set and the initialization algorithm, thus obtaining the initialized characteristic population genes.

The set characteristic screening optimization method optMtd can obtain initialized characteristic population genes according to optimal characteristic population gene set.

In an embodiment, the obtaining an optimal characteristic population gene of each round by a set analysis method, a fitness function, and an iteration of a genetic algorithm based on the initialized spectral dataset and the initialized characteristic population genes, including:

selecting a corresponding analysis method as the set analysis method according to analysis requirements, the set analysis method determines model parameters and an evaluation indicator of an analysis method based on the initialized spectral dataset and the initialized characteristic population genes; among them, the set analysis method may be one selected from a quantitative analysis method, a semi quantitative analysis method, a discriminant analysis method, and an analysis method that can be characterized by modeling;

the fitness function obtaining a population fitness based on the initialized characteristic population genes and the model parameter and the evaluation indicator of the analysis method;

among them, the fitness function can be expressed as fnMtd (fg, k, Mv), where, the fg represents the initialized characteristic population genes, the k represents the evaluation indicator of the analysis method, the My represents the model parameters of the analysis method, thus obtaining the population fitness expressed as fitness;

the genetic algorithm iterates based on the population fitness and the initialized characteristic population genes to obtain a new characteristic population gene until an iterative algebra of the genetic algorithm reaches a set maximum value or the population fitness reaches a set fitness threshold value, and taking a last obtained new characteristic population gene as the optimal characteristic population gene.

In an embodiment, the performing combination statistics and discriminant analyses on the optimized characteristic spectral information set to complete an adaptive characteristic spectral line screening, including:

performing one or more of a probability analysis, a frequency analysis, and any combination result analyses on the optimized characteristic spectral information set to obtain statistical information of each characteristic spectral line; and by the discriminant analyses, if an evaluation value corresponding to the statistical information of the each characteristic line being greater than a set screening threshold value, completing the adaptive characteristic spectral line screening of the optimized characteristic spectral information set.

Among them, the performing combination statistics and discriminant analyses on the optimized characteristic spectral information set, which can obtain the statistical information of the each characteristic line expressed as Q(i), where, the i represents a corresponding index of the each characteristic spectral line; by the discriminant analyses, when P(Q(i))>Thr, completing the adaptive characteristic spectral line screening of the optimized characteristic spectral information set, where the P(Q(i)) represents the evaluation value corresponding to the statistical information of the each characteristic spectral line, and the Thr represents the screening threshold value.

To sum up, the adaptive characteristic spectral line screening method based on atomic emission spectrum provided by the present disclosure, using a set characteristic screening optimization method to initialize a spectral dataset in view of different analysis requirements of a sample to be analyzed, and obtaining corresponding initialized characteristic population genes; based on the initialized characteristic population genes, obtaining an optimized characteristic spectral information set by a set analysis method, a fitness function, and an iteration of a genetic algorithm; the present disclosure can efficiently and automatically screen characteristic spectral lines that meet the analysis requirements in a complex atomic emission spectrum, ensure the effectiveness and accuracy of screening the characteristic spectral lines, and provide a reliable guarantee for the accurate and stable implementation of analysis tasks. The method is applicable to atomic emission spectrum with each of light sources such as spark light source, arc light source, plasma light source, and laser light source; and the method is used to realize adaptive screening of characteristic spectral lines of analytical elements in atomic emission spectrometry analysis technology.

Taking three series of stainless steel scraps in an embodiment, the adaptive characteristic line screening method based on atomic emission spectrum is described in detail.

The three series of stainless steel scraps include 200 series, 300 series, and 400 series stainless steel samples. In the embodiment, the adaptive characteristic line screening method based on atomic emission spectrum includes:

selecting stainless steel samples of nine grades conforming to 200 series, 300 series, and 400 series;

in an air environment, using a laser induced breakdown spectrometer to complete a test of the above samples; after using a laser spectrum software to collect signals, correct background, and normalize; obtaining spectral signal values after preprocessing, and selecting all spectral information as a spectral dataset;

based on an analysis requirement for classification, selecting a Support Vector Machine (SVM) algorithm as an analysis method to verify accuracy, ksvm represents an evaluation indicator of the analysis method;

setting and optimizing a fitness function of multi-dimensional characteristic spectral line quality evaluation based on the genetic algorithm expressed as fnMtd (fgsvm, ksvm, Msvm), among them, the fgsvm represents a characteristic population gene, the Msvm represents model parameters of the analysis method; thus obtaining a population fitness expressed as fitness;

establishing a characteristic screening optimization method optMtd (gav, dataset, t), where the gav represents basic parameters of a current genetic algorithm, the basic parameters include a mutation rate, a crossover rate, a population number, an evolution algebra, characteristic screening results and so on; and t represents optimization rounds.

A process of characteristic spectral line optimization screening includes steps:

(1) initializing characteristic population genes and a spectral dataset by the characteristic screening optimization method optMtd;

(2) obtaining new population genes by a genetic algorithm; obtaining model parameters and evaluation indicators by the analysis method; obtaining a population fitness expressed as fitness by the fitness function expressed as fnMtd;

among them, the fitness is an evaluation value of gene quality, and judging quality of the characteristic spectral line corresponding to genes by the evaluation value;

(3) obtaining an optimal characteristic population gene of a current round expressed as $I_i$ until an iterative algebra of the genetic algorithm reaches a maximum value or the population fitness reaches a corresponding threshold value;

(4) repeating the above steps until optimization rounds reach a corresponding threshold value, and obtaining an optimal characteristic population gene set I=($I_1$, $I_2$, . . . , $I_n$); and (5) decoding the optimal characteristic population gene set and obtaining an optimized characteristic spectral information set.

Performing combination statistics and discriminant analyses on the characteristic spectral information set to obtain statistical information Q(i), completing an adaptive characteristic spectral line screening of an optimal characteristic spectral information set, thus obtaining characteristic spectral lines corresponding to input spectral signals.

For actual samples of 200 series, 300 series and 400 series stainless steel, using the method of the present disclosure to screen out characteristic spectral lines with stronger energy in a spectrogram database, such as Ni341.476 nanometers (nm), Cr425.435 nm, Si251.612 nm, Mo281.615 nm, and Cu327.396 nm. These spectral lines are also classic spectral lines commonly used for manual experience screening. At the same time, the method also screens out other characteristic spectral lines, such as 229.749 nm, 338.057 nm, 349.296 nm for the main element Ni and 357.869 nm, 359.349 nm, 427.48 nm for the main element Cr.

In the embodiments of the present disclosure, SVM is used for classification modeling and testing of the actual samples, 3673 actual samples of stainless steel are tested. The classification analysis result for different series of 200 series, 300 series, and 400 series stainless steel is shown in TABLE 1, and the classification analysis result for grades of 300 series stainless steel is shown in TABLE 2. The classification accuracy of the adaptive characteristic spectral line screening method of the present disclosure is better than the classification accuracy of characteristic spectral lines screened by manual experience. In an application of the classification for grades of stainless steel, the advantages are more obvious, which shows the method of the present disclosure is effective and has the superiority of characteristic screening for analysis tasks.

TABLE 1

The classification analysis result for 200 series, 300 series, and 400 series stainless steels by different characteristic screening methods

| Classification | Classification accuracy of adaptive characteristic spectral lines | Classification accuracy of characteristic spectral lines screened by manual experience |
| --- | --- | --- |
| 200 | 93.9% | 94.1% |
| 300 | 94.7% | 90.1% |
| 400 | 92.8% | 89.4% |

TABLE 2

The classification analysis result for grades of 300 series stainless steel by different characteristic screening methods

| Classification | Classification accuracy of adaptive characteristic spectral lines | Classification accuracy of characteristic spectral lines screened by manual experience |
| --- | --- | --- |
| 301 | 92.2% | 86.52% |
| 304 | 90.7% | 75.25% |
| 316 | 97.8% | 96.32% |

As atomic emission spectral lines of the stainless steel are various and the interference caused by the matrix of the stainless steel is serious for classification analysis requirements of grades of the stainless steel, the difference of the content of characteristic elements is small and the overlap is serious. Therefore, the characteristic spectral lines of elements screened by manual experience; the quality, quantity, and others of the characteristic spectral lines cannot meet the detection requirements of classification analysis of stainless steel, the lack of classification analysis ability for grades of the stainless steel is particularly obvious. As shown in TABLE 2, the classification accuracy of characteristic spectral lines screened by manual experience is significantly weaker than the classification accuracy of adaptive characteristic spectral lines. In terms of the effectiveness of the spectral lines, the verification and screening process of characteristic spectral lines screened by manual experience are also cumbersome and inefficient, and it is difficult to obtain an optimal result, which is not conducive to providing reliable and effective spectral line information for the analysis method efficiently, accurately and stably.

For different analysis requirements of the embodiments of the present disclosure, selecting models of analysis methods to introduce characteristic analysis and evaluation, establishing screening optimization methods and optimal spectral screening methods, performing spectral analyses on selected samples, obtaining atomic emission spectral signals and performing adaptive characteristic spectral line screening on the atomic emission spectral signals, thus obtaining characteristic spectral information required for analyses.

Figure 2:
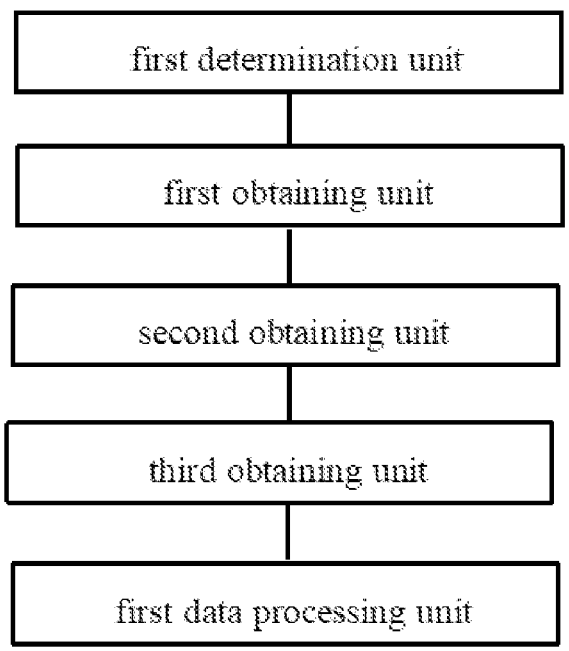
FIG. 2 shows a schematic structural diagram of an adaptive characteristic spectral line screening system based on atomic emission spectrum of the present disclosure.

As shown in FIG. 2, the present disclosure also provides an adaptive characteristic spectral line screening system based on atomic emission spectrum, which is applied to any of the above adaptive characteristic spectral line screening methods based on atomic emission spectrum, includes:

a first determination unit 201, configured to determine a spectral dataset based on original spectral signals of a sample to be analyzed;

a first obtaining unit 202, configured to performing a plurality of optimization rounds of characteristic screening on the spectral dataset by using a set characteristic screening optimization method, and obtaining an initialized spectral dataset of each round of the characteristic screening and initialized characteristic population genes corresponding to the initialized spectral dataset;

a second obtaining unit 203, configured to obtain an optimal characteristic population gene of each round by a set analysis method, a fitness function, and an iteration of a genetic algorithm based on the initialized spectral dataset and the initialized characteristic population genes;

a third obtaining unit 204, configured to obtain an optimized characteristic spectral information set corresponding to an optimal characteristic population gene set composed of optimal characteristic population genes of each round in the set optimization rounds when performing the plurality of optimization rounds up to set optimization rounds; and a first data processing unit 205, configured to perform combination statistics and discriminant analyses on the optimized characteristic spectral information set to complete an adaptive characteristic spectral line screening.

The present disclosure also provides an electronic device, including a memory, a processor, and a computer program stored in the memory and executable on the processor, when the processor executes the computer program, realizing the steps of any of the above adaptive characteristic spectral line screening methods based on atomic emission spectrum.

The present disclosure also provides a non-transient computer readable storage medium which stores a computer program, when the computer program is executed by a processor, realizing the steps of any of the above adaptive characteristic spectral line screening methods based on atomic emission spectrum.

The embodiments of devices described above are only schematic, in which units described as separate parts can be or cannot be physically separated. And parts displayed as units can be or cannot be physical units, that is, they can be located in one place, or they can be distributed to multiple network units. Some or all of the modules can be selected according to the actual needs to achieve the purpose of this embodiment. Ordinary skilled in the art can understand and implement without creative work.

Through the above description of the embodiments, those skilled in the art can clearly understand that each embodiment can be realized by means of software and a necessary general hardware platform, and of course, it can also be realized by means of hardware. Based on such understanding, the essence of the above technical scheme or the part of the technical scheme contributing to the prior art can be embodied in the form of a software product, the software product can be stored in a computer-readable storage medium, such as ROM/RAM (Read-Only Memory/Random Access Memory), magnetic disk, optical disk, and so on. And the software product includes a plurality of instructions for enabling a computer device (which can be a personal computer, a server, or network devices, etc.) to perform the methods described in the various embodiments or portions of the embodiments.

Finally, it should be noted that the above embodiments are only used to illustrate some technical schemes of the present disclosure, not to limit the present disclosure. Although the present disclosure has been described in detail with reference to the foregoing embodiments, those skilled in the art should understand that he/she can still modify the technical schemes recorded in the foregoing embodiments, or equivalently replace some of the technical features; These modifications or substitutions do not make the essence of the corresponding technical schemes depart from the spirit and scope of protection of the present disclosure.

What is claimed is:

1. An adaptive characteristic spectral line screening method based on atomic emission spectrum, comprising following steps:
    step 1: determining a spectral dataset based on original spectral signals of a sample to be analyzed;
    step 2: performing a plurality of optimization rounds of characteristic screening on the spectral dataset by using a set characteristic screening optimization method, obtaining an initialized spectral dataset of each round of the plurality of optimization rounds of the characteristic screening and initialized characteristic population genes corresponding to the initialized spectral dataset;
    step 3: obtaining an optimal characteristic population gene of the each round by a set analysis method, a fitness function, and an iteration of a genetic algorithm based on the initialized spectral dataset and the initialized characteristic population genes;
    step 4: obtaining an optimized characteristic spectral information set corresponding to an optimal characteristic population gene set composed of the optimal characteristic population gene of the each round of the plurality of optimization rounds when the plurality of optimization rounds reach set optimization rounds; and
    step 5: performing combination statistics and discriminant analyses on the optimized characteristic spectral information set to complete an adaptive characteristic spectral line screening;
    wherein the step 3 comprises:
        selecting a corresponding analysis method as the set analysis method according to analysis requirements, the set analysis method determining a model parameter and an evaluation indicator of the set analysis method based on the initialized spectral dataset and the initialized characteristic population genes;
        the fitness function obtaining a population fitness based on the initialized characteristic population genes and the model parameter and the evaluation indicator of the set analysis method; and
        the genetic algorithm iterating based on the population fitness and the initialized characteristic population genes to obtain a targeted characteristic population gene until an iterative algebra of the genetic algorithm reaches a set maximum value or the population fitness reaches a set fitness threshold value, and taking a last obtained targeted characteristic population gene as the optimal characteristic population gene;
    wherein the step 5 comprises:
        performing a probability analysis and a frequency analysis on the optimized characteristic spectral information set to obtain statistical information of each characteristic spectral line; and
        completing the adaptive characteristic spectral line screening of the optimized characteristic spectral information set by the discriminant analyses, when an evaluation value corresponding to the statistical information of the each characteristic line being greater than a set screening threshold value;
    wherein the adaptive characteristic spectral line screening method further comprises:
        applying the adaptive characteristic spectral line screening to classify materials based on the atomic emission spectrum.

2. The adaptive characteristic spectral line screening method based on atomic emission spectrum according to claim 1, the determining a spectral dataset based on original spectral signals of a sample to be analyzed, comprising:
    selecting a sample meeting a coverage of elements and contents as the sample to be analyzed according to analysis requirements;
    performing a spectral analysis on the sample to be analyzed to obtain the original spectral signals of the sample to be analyzed;
    performing a spectral preprocessing on the original spectral signals to obtain spectral information; and
    selecting all or some of the spectral information processed by the spectral preprocessing to build the spectral dataset;
    wherein the spectral preprocessing comprises background correction and filtering noise reduction, the background correction comprises fitting background correction (FBC), and the filtering noise reduction comprises adaptive filtering.

3. The adaptive characteristic spectral line screening method based on atomic emission spectrum according to claim 1, the performing a plurality of optimization rounds of characteristic screening on the spectral dataset by using a set characteristic screening optimization method, obtaining an initialized spectral dataset of each round of the plurality of optimization rounds of the characteristic screening and initialized characteristic population genes corresponding to the initialized spectral dataset, comprising:
    performing the plurality of optimization rounds of the characteristic screening on the spectral dataset, selecting some or all of spectral information from the spectral dataset in the each round of the characteristic screening to obtain the initialized spectral dataset; and
    encoding the spectral information in the initialized spectral dataset based on spectral characteristics to obtain uninitialized characteristic population genes, and determining the initialized characteristic population genes based on the uninitialized characteristic population genes.

4. The adaptive characteristic spectral line screening method based on atomic emission spectrum according to claim 1, wherein the original spectral signals are atomic emission spectral signals which comprise wide band continuous spectrum signals acquired by an array detector or narrow band spectrum signals acquired by a photodetector.

5. The adaptive characteristic spectral line screening method based on atomic emission spectrum according to claim 1, wherein the set analysis method comprises one of a quantitative analysis method, a semi quantitative analysis method, a discriminant analysis method, and an analysis method characterized by modeling.

6. An adaptive characteristic spectral line screening system based on atomic emission spectrum, comprising: a memory, a processor, and a computer program stored in the memory and executable by the processor, wherein the processor is configured to, when the computer program is executed by the processor, implement the steps of the adaptive characteristic spectral line screening method based on atomic emission spectrum according to claim 1.

* * * * *